BROADCASTING PROGRAM SELECTOR

Filed Dec. 10, 1951

INVENTOR

William H. Sellers

BY Bacon + Thomas

ATTORNEYS

Patented June 22, 1954 2,681,523

UNITED STATES PATENT OFFICE 2,681,523

BROADCASTING PROGRAM SELECTOR

William H. Sellers, Denver, Colo.

Application December 10, 1951, Serial No. 260,883

1 Claim. (Cl. 40—70)

The present invention relates to a novel chart device and more particularly to such a device including means for aiding in the selection of a desired radio or television program.

The usual manner of selecting a radio or television program at any given time is to consult one of the daily newspapers which lists that day's program as a regular service. However, inconvenience often arises when the paper has been misplaced or is in use by another and this invention is predicated on the fact that it would be highly convenient to have accessible at all times near the receiving set, a device which by simple manipulation would give at a glance the programs of a number of stations in the area for a short period of time to the exclusion of the remainder of the day.

It is an object of the present invention to provide a program selecting device wherein the programs for a given day can readily be replaced by those of a succeeding day.

Another object of the invention is to provide a program selector wherein the programs for a plurality of stations for a limited period of time are clearly visible in a condensed space but in which the programs for the remainder of the day are completely obscured from view.

A further object of the invention is to provide a program selecting device which is easy to manipulate and whose operation is easily understood by all.

A still further object of the present invention is to provide a program selector which is compact in construction and can be readily stored near the radio or television set.

Another and further object of the present invention is to provide a program selector which can be easily manufactured of inexpensive materials but which will be highly attractive in appearance.

Still another and broader object of the invention is to provide a readily manipulated chart reading device wherein one chart is easily replaced by another.

A more specific object of the invention is to provide a radio chart device adapted for use in a broadcasting service wherein a set of charts, for example, covering a period of one week, can be furnished to a subscriber, or distributed as an advertising medium by a local merchant, etc.

Other and further objects of the present invention will be apparent from the following detailed description of the same taken in conjunction with the drawings in which.

Figure 1:
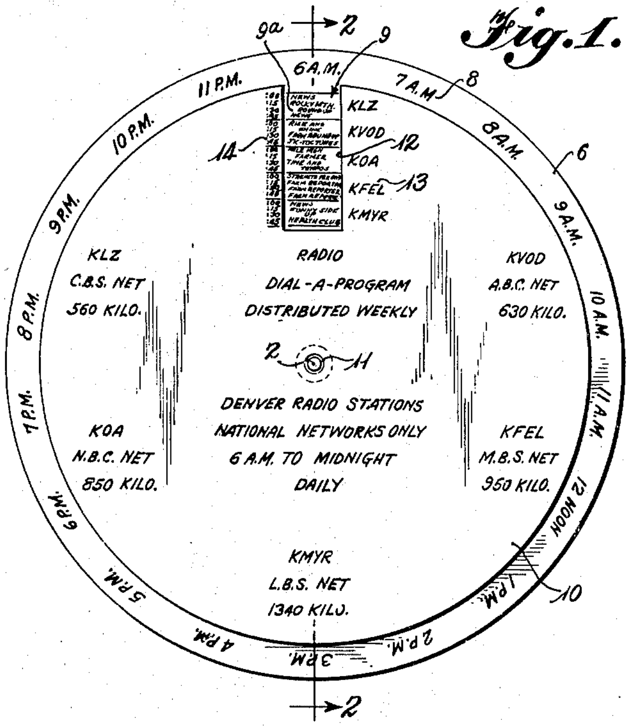
Fig. 1 is a plan view of the assembled device.
Figure 2:
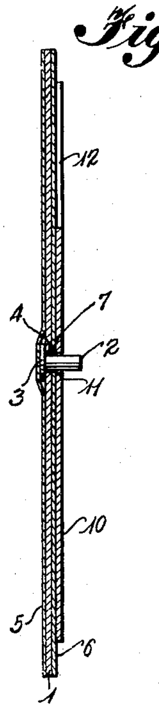
Fig. 2 is a sectional view taken on the line 2—2 of Figure 1.
Figure 3:
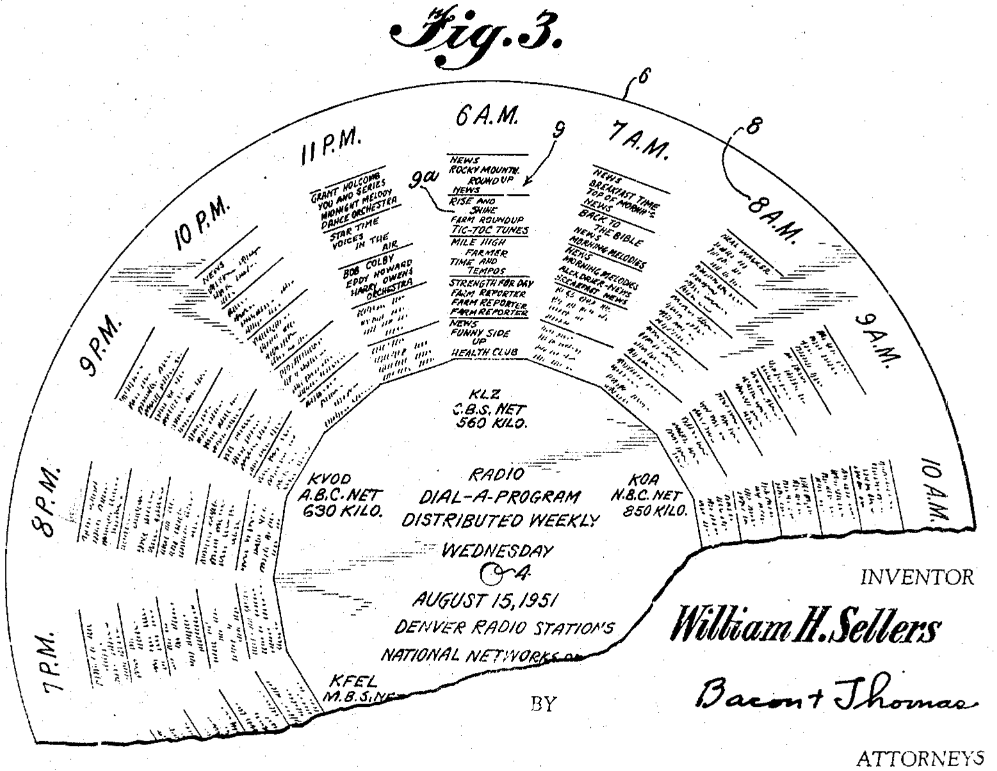
Fig. 3 is an enlarged fragmentary view of the replaceable chart.

Referring to the drawings, it will be seen that the present chart device comprises a base member 1 of sheet material. The composition of this material is not essential to the present invention but it should possess sufficient rigidity to be self-sustaining and capable of withstanding daily use over a long period of time. It has been found that a relatively thick cardboard sheet will suffice but, if desired, the base member can be formed of other material, such as wood, metal or plastic. In the drawing, the base member 1 is shown as being circular in configuration in the form of a disc and this shape is preferred because it permits the construction of a more compact device but it is to be understood that other forms may be chosen, if desired.

Secured to the base member 1 is an upwardly extending stud 2 of metal or other rigid material. The stud member 2 may be secured to the base member 1 in any suitable manner but it has been found convenient to provide the stud 2 with a flat head portion 3 which will limit the projection of stud 2 through an aperture 4 in the base member. If the base member 1 is in the preferred disc form the aperture 4 will be centrally located. Retraction of the stud member may easily be prevented by adhering to the back surface of base member 1 in overlying relationship to the flat head 3 of stud 2, a relatively thin section of sheet material 5.

A chart member 6 is replaceably mounted on base member 1 by the projection of stud member 2 through an aperture 7 in said chart member. The material of which the chart is composed need not be self-sustaining as was the case with the base member 1 and it has been found that ordinary paper will suffice, but again the nature of this material is not an essential feature of the present invention. Also, the configuration of the chart member is not of particular importance, but it has been found desirable to make the chart member in the form of a disc and to have the chart member conform to the configuration of the base member 1. It has not been found necessary to have any positive means for preventing relative rotation between base member 1 and chart 6 during the manipulation of the device, which will be described hereinafter, as the inherent frictional drag present between the contiguous surfaces will prevent undue shifting of one member relative to another.

About the aperture 7 in chart 6, there is arranged in a circumferential manner a series of indicia 8 representing major time divisions of a day. Since the major portion of the day's programing of radio and television stations occurs between the hours of 6:00 a. m. and 12:00 midnight, it has been found practical to provide hourly indications representing only this portion of a day.

Also, on the chart 6 and extending radially inwardly from each member of the series of hourly indications has been placed a column 9 containing a series of indicia 9*a* representing the programs on a particular day of the principal radio stations in a given area for time intervals between the hour indicated thereover and the next succeeding hour.

The above described arrangement leaves space in the central portion of the chart 6 which may have printed thereon various items, such as advertising material, the call letters and frequencies of the various radio stations represented by the chart and the name of the day and date for which the particular chart is applicable.

Releaseably and rotatably secured to the base member 1 and overlying the chart member 6 is a dialing disc 10 of generally circular configuration, the diameter of which should be slightly less than that of the circumferentially arranged series of indicia 8 so that the hourly indications are visible at all times but greater than that represented by the outermost portions of radial columns 9 so that programs will normally be covered. The dialing disc 10 has a centrally located aperture 11 therein through which stud member 2 projects and it has been found unnecessary to provide any positive means to maintain the device in assembled relation since the weight of disc 10 is sufficient for this purpose. This makes the present device very easy to assemble and disassemble to remove and replace chart member 6.

The disc 10 is provided with a radially extending slot 12, the dimensions of which are such that it will uncover one, but only one, of the radially extending columns 9 of program identifying indicia. Along one edge of the slot 12 in vertical alignment is placed a series of indicia 13 identifying the radio stations represented by the chart with the identification of each station situated in horizontal alignment with the program of that particular station.

Along the opposite edge of the slot 12 is placed a series of indicia 14 representing minor time divisions of the interval between succeeding members of the major time division series 8, which in the present case have been shown in hourly intervals.

Each minor time designation is positioned so that it will appear in horizontal alignment with the particular program of each individual station at that time. The station identifying indicia and that representing the minor divisions of time have been shown as being placed on opposite edges of slot 12, but if desired, both may be placed on the same edge portion, the correct horizontal alignment being maintained, and if further desired the minor time divisions (designations) may be placed on chart 6 inside slot 12 instead of being placed on the respective edges of slot 12 of dialing disc 10.

The face of dialing disc 10 may also be employed to display material similar to that which may be placed in the central portion of replaceable chart member 6.

With the above description of the invention in mind, the operation of the device will be obvious. Assuming, for example, that the time is 6:45 a. m., disc member 10 will be rotated until the slot therein opens directly below the 6:00 a. m. indication on the chart. Then, with the programs of a plurality of stations visible in only the small space afforded by slot 12, it will be an extermely simple matter to observe the different programs being aired at the time of 6:45 a. m. which is clearly indicated in the minor time division column. The operator can then readily note the call letters 13 opposite a desired program and tune his radio receiver accordingly.

By the present invention, I have provided a device, which readily lends itself to the furnishing of a weekly program service for a number of broadcasting stations. For a week ahead, each day's program can be printed on an inexpensive chart. The charts for the seven consecutive days of the week are all inserted at the same time, and are thereafter removed, respectively, daily as used up. It is a very simple matter to change from one day's program to another, since all that is necessary is to lift the dialing disc 10, and remove the obsolete chart. If desired, two day's programs can be placed upon a single sheet of material, since both front and back may be utilized.

Although my invention has been described particularly in connection with a program indicating device, it is to be understood that it can have much broader application. The principles disclosed herein may readily be applied to the reading of a wide variety of intelligence, particularly of the type where it is necessary to place the printed material on a plurality of charts, as the individual charts are readily replaceable, one by the other.

Having described my invention, I claim:

A broadcasting program selector, comprising: a disc member of sheet material having sufficient rigidity to be self-sustaining; an upwardly projecting stud member secured to said disc member at its center; a centrally apertured circular chart member releasably secured to said disc member by projection of said stud member through said central aperture in said chart member, said chart member being of the same size as said disc member and having a circumferential series of spaced time indicia, each individual member of said series representing a major time division, said chart member also having columns including a series of indicia representing the programs of a plurality of broadcasting stations extending radially inwardly from each of said major time indicia with said programs being for the time interval between the major time indication appearing thereover and the next succeeding major time indication; and a centrally aperture dialing disc member releasably and rotatably mounted on said base member in immediately overlying relation with respect to said chart member by projection of said stud member through said central aperture in said dialing disc member, the radius of said dialing disc member being less than that of said circumferentially arranged series of major time division indicating indicia so that said major time indicating indicia are always exposed but greater than the radius of a circle represented by the outermost portions of said columns of radially extending program indicating indicia so that said program indicating indicia are normally covered, said dialing disc member being further provided with a radially extending slot dimensioned so as to expose a selected one of said columns of program indicating indicia upon rotation of said dialing disc member, said dialing disc member also having in vertical alignment adjacent at least one edge of said slot a series of indicia identifying each of said plurality of broadcasting stations and a series of indicia representing minor time divisions, each member of said last-mentioned series including minor time divisions of the interval between each member of the circumferential series indicating major time divisions and the next succeeding member of that series, the arrangement being such that when said dialing disc is rotated to uncover a selected one of said columns of program indicating indicia, a particular program, the time of broadcasting of said program, and the station broadcasting said program will appear in horizontal alignment.

References Cited in the file of this patent

UNITED STATES PATENTS

| Number | Name | Date |
|---|---|---|
| 916,564 | Kristofek | Mar. 30, 1909 |
| 1,453,100 | Fulgora | Apr. 24, 1923 |
| 1,488,840 | Scott | Apr. 1, 1924 |
| 2,098,933 | Hathaway | Nov. 9, 1937 |
| 2,508,894 | Schloer | May 23, 1950 |